INVENTORS
MATAICHI TAJIMA
TUTOMU KIMURA

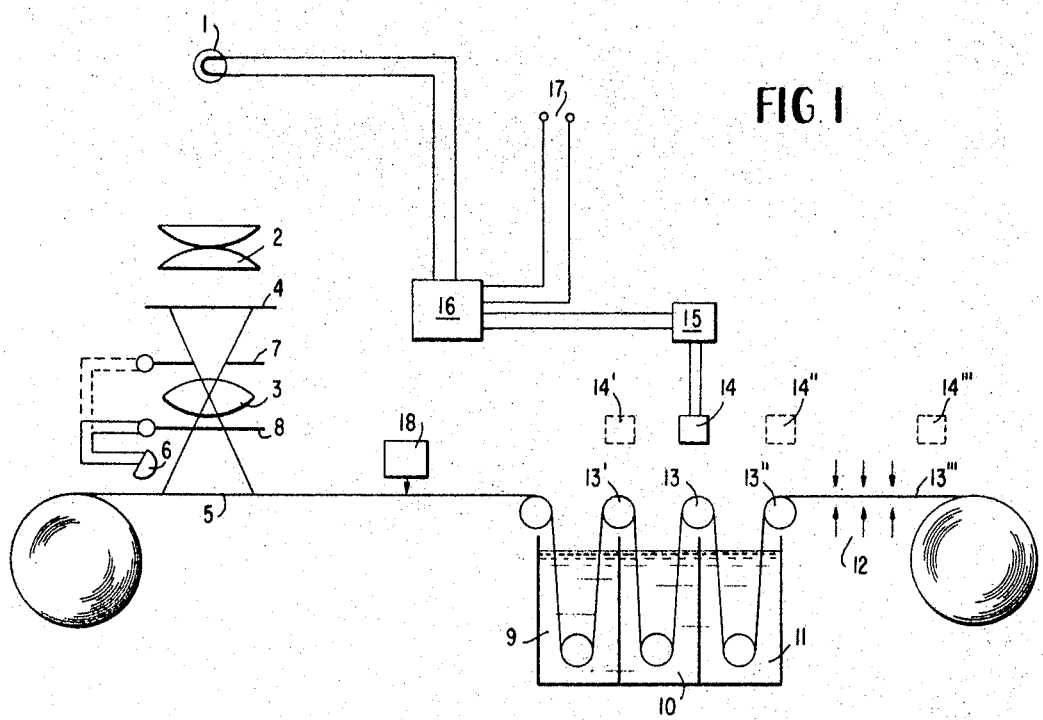
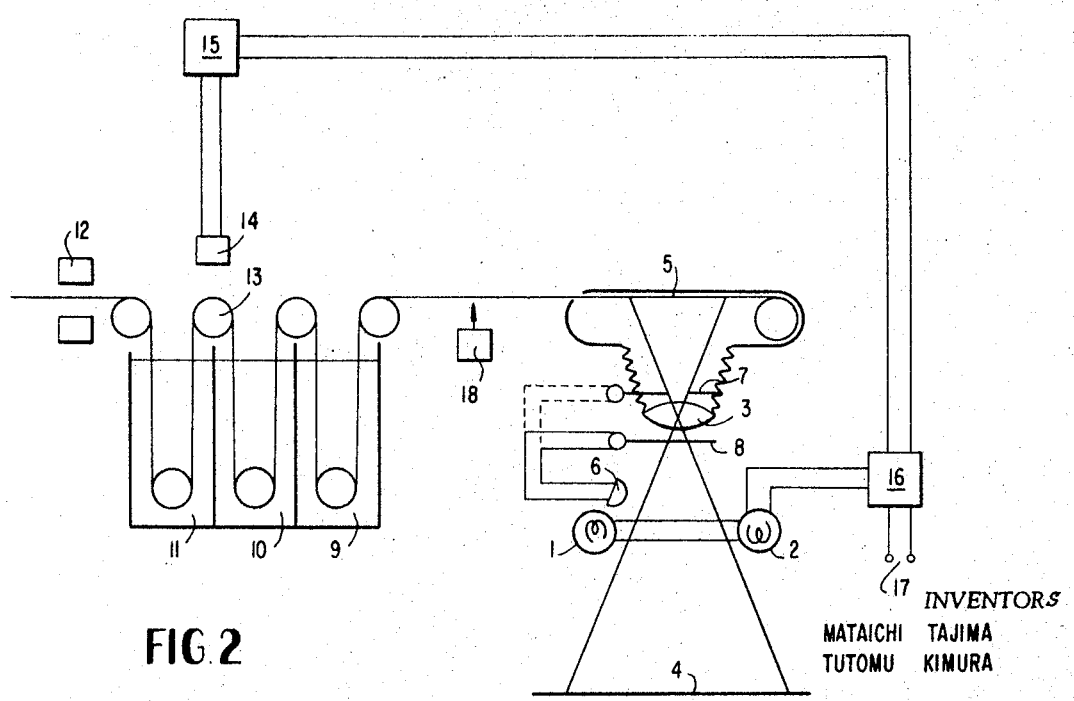

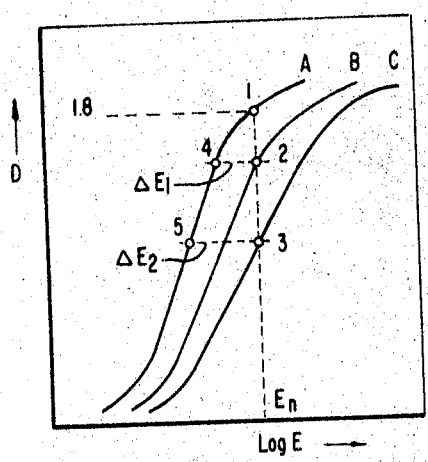
FIG.8
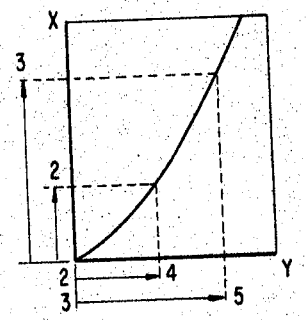
FIG.9
FIG.12
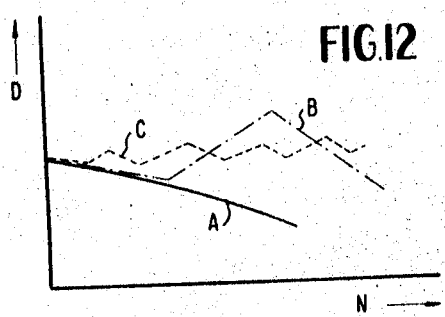
FIG.10
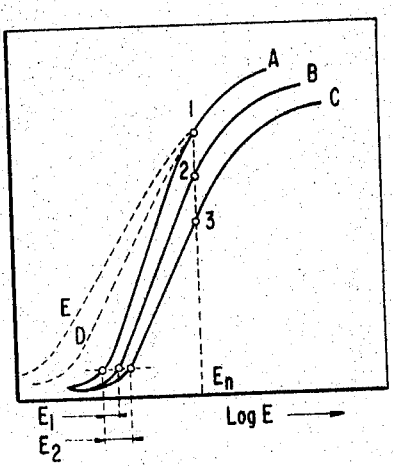
FIG.13
FIG.11
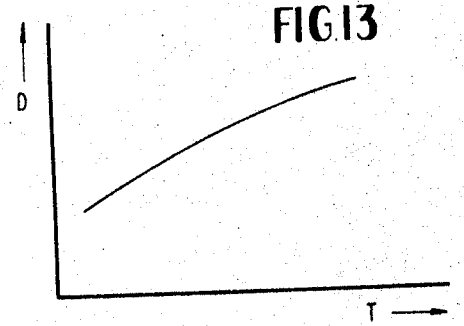
FIG.14
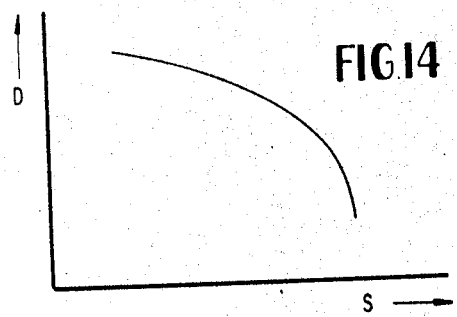

United States Patent Office 3,462,221
Patented Aug. 19, 1969

3,462,221
METHOD FOR CONTROLLING THE QUALITY OF PHOTOGRAPHIC IMAGE
Mataichi Tajima and Tutomu Kimura, Ashigara-Kamigun, Kanagawa, Japan, assignors to Fuji Shashin Film, Kabushiki Kaisha, Ashigara-Kamigun, Kanagawa, Japan
Filed Oct. 17, 1966, Ser. No. 587,058
Claims priority, application Japan, Oct. 15, 1965, 40/63,295; Oct. 18, 1965, 40/63,813; Jan. 11, 1966, 41/1,175; Jan. 12, 1966, 41/1,667
Int. Cl. G03b 27/78
U.S. Cl. 355—77                                   14 Claims

ABSTRACT OF THE DISCLOSURE

A method for controlling the exposure value in an automatic apparatus for exposing and processing light sensitive material. The method includes detecting the density of the image formed on the exposed, developed, and processed material after the end point of the developing process. The detected density is then converted into an electrical signal which controls the extent of exposure of subsequent material by using the signal to automatically adjust an exposure control device. The same detected density signal is also used to control variables in the processing tank such as temperature and the speed at which the photosensitive material moves through the tank.

---

Figure 3:
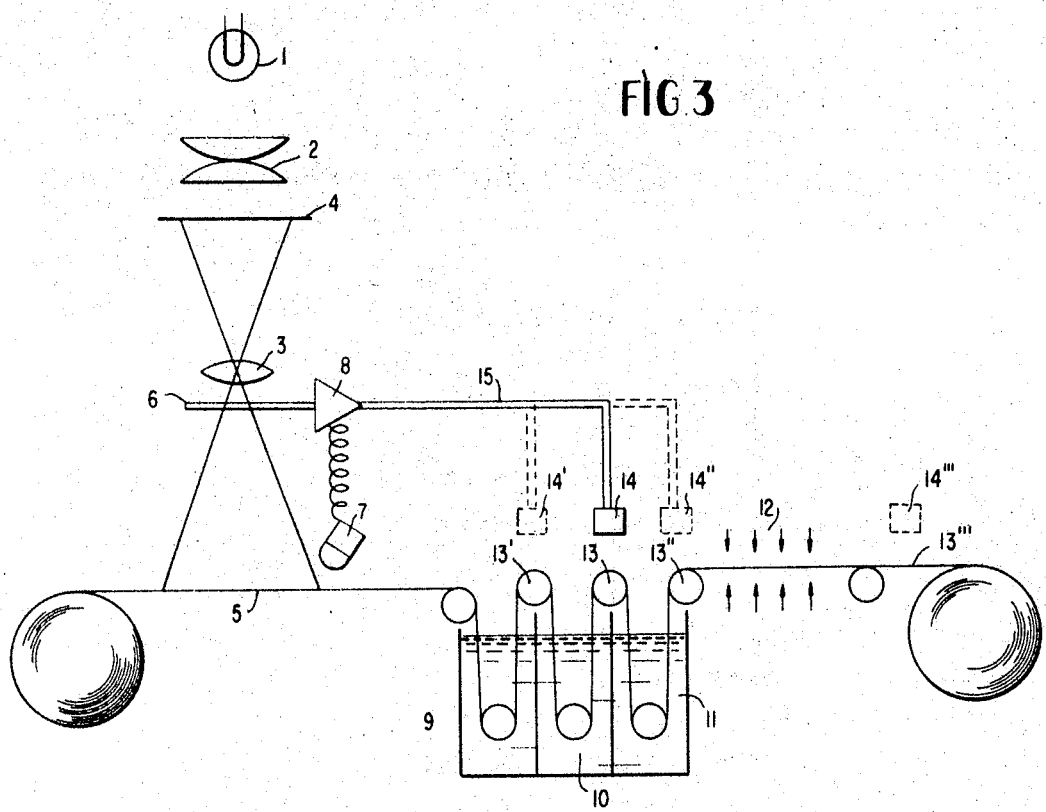

The present invention relates to a method for controlling the quality of photographic image that is finally produced by adjusting the amount of light exposure on photographic sensitive materials or the processing conditions of the exposed photographic sensitive materials.

Whether or not photographic sensitive materials are properly exposed, in copying and printing, can be judged correctly only after the photographic image is represented by photographic processing, such as a developing operation, which is to follow exposure.

There have heretofore been employed in the field devices, such as, exposure meters, auto-timers, or electric eye sytsems. Such mechanisms or systems are effective only on the condition that the photographic process, after exposure, is sufficiently stable to ensure perfect representation of the image. However, if a photographic process, especially a process of developing, is not stable, printing the image on photographic sensitive materials does not produce a result of the same quality, even if rendered with the same value of exposure for the same light image. This can be attributed to the following factors that are apt to cause a change in the developing action: fatigue of developer due to use, excess or shortage of the volume of replenisher, temperature of process solution, time-duration of immersion of sensitive material in the process solution, flow rate of process solution on the surface of photographic sensitive material, and so forth.

In addition, there have so far been numerous devices tried in order to maintain a uniform image quality as the result of photographic processing, such as developing. Included are, for example:

(1) A method to maintain a constant temperature of the developer, (2) A method for keeping constant a feed volume of replenisher to be added to the process solution, (3) A method for manually controlling a volume of replenisher on all occasions when the treatment fails to work satisfactorily, to feed a new replenisher to the process solution.

Items (1) and (2) above refer to the method for control designed to maintain constant the condition established at the initial stage of processing, and by no means for controlling the operation based on the result of photographic finish and quality. Item (3) refers to the method for controlling the volume for a comparatively long duration of time, so that a considerable change in quality of a finished photograph may often result therefrom. The mentioned three factors are remote from the principles of automation.

The present invention is to provide a method for controlling the quality of the photographic image finally produced on the sensitive material, by adjusting rapidly, exactly, and automatically the amount of exposure of the photographic process condition, or both by means of providing a system for controlling the amount of exposure, such as, shutter, diaphragm, filter, etc. to adjust the light from the lamp of a photographic printer or light source for exposure, or a system for controlling photographic process conditions, such as, temperature control, unit of developer, time adjustment of developing, feed adjustment of replenisher, etc. with a signal which, by detecting the quality of the photographic image being produced on the sensitive materials, serves to control the above mentioned control systems, for exposure, control system for photographic processing conditions, or both of the control systems mentioned above.

Figure 4:
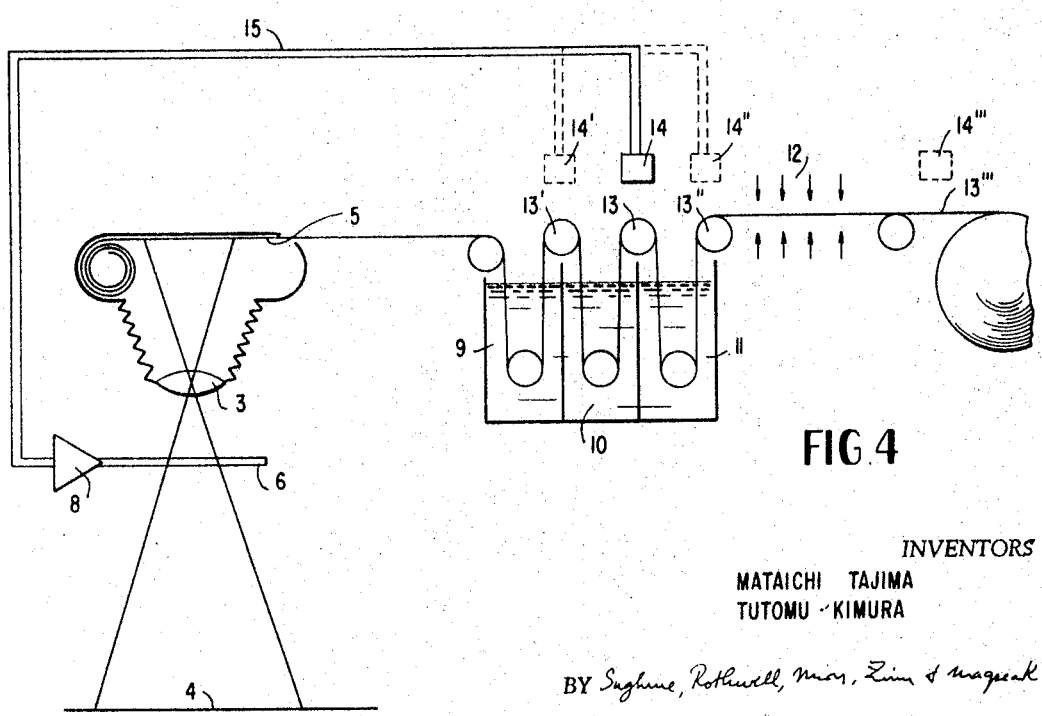
Figure 5:
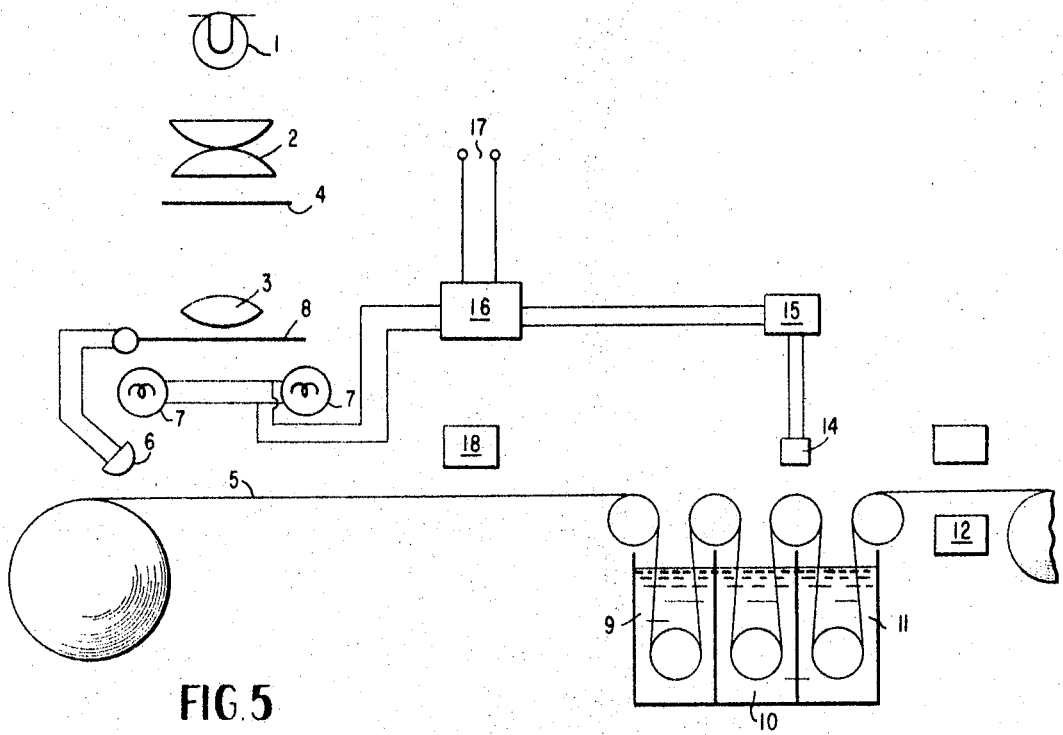
Figure 6:
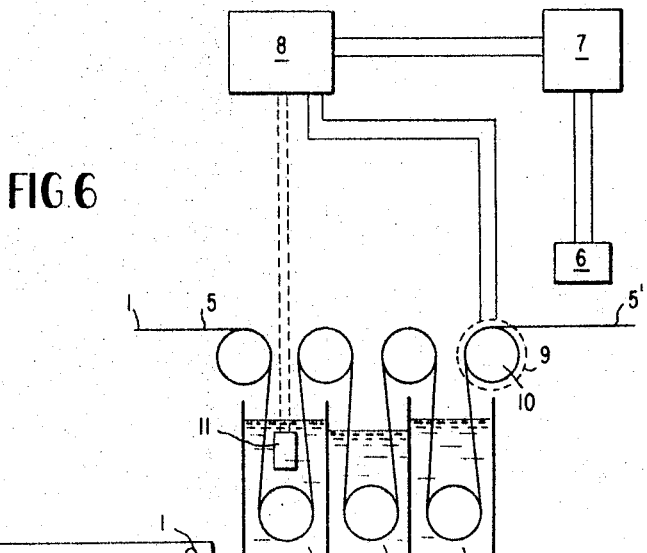
Figure 7:
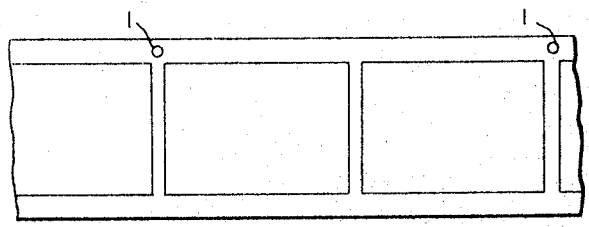

FIG. 1 is a schematic diagram showing an example, wherein a lamp for printing is controlled in terms of auto-line which combines an automatic photographic printer and automatic processor. FIG. 2 is a schematic diagram showing an example wherein the invention is effected in the auto-line which combines an automatic copying camera and an automatic process, to control a light source for photographing. FIG. 3 is a schematic diagram showing an example wherein this invention is effected in a printer-processor which combines an automatic photograph printer and automatic processor, to control the intensity of light or time of exposure, by equipping an exposure control device in a light passage from its source for printing. FIG. 4 is a schematic diagram showing an example in which this invention is effected in a combination of automatic copying camera and automatic processor to control the exposure adjustment system of the automatic copying camera. FIG. 5 is a schematic diagram showing an example in which this invention is effected in a combination of an automatic printer equipped with a sub-exposing accessory to give multi-tone and an automatic processor to control a light source for sub-exposure. FIG. 6 is a schematic diagram of an example in which this invention is effected in an automatic processor to control the system for controlling process condition. FIG. 7 is a plane view of the photographic sensitive material and the image thereof. FIGS. 8 through 11 are graphs showing respectively the relation of the exposure value and the image density resulting from the photographic process. FIG. 12 is a graph showing the relation of a number of processing the photographic sensitive material and a developing image density in the automatic processor. FIG. 13 is a graph showing the relation of the temperature and the photographic density of the developer in the developing tank. FIG. 14 is a graph showing the relation of processing speed and density of a developing image in the automatic processor.

The present invention relates to the method and apparatus for controlling a system of adjustment of developing process temperature, a system for controlling the time for developing process, a system for adjusting the feed volume of replenisher in a developing process, as a system for controlling the developing process condition in a photographic printer, wherein the density of the image being formed in the photographic sensitive material following the developing process is detected by a photographic density detector incorporated in the automatic processor, after the end point of developing process. With a detected value, as a signal, a voltage output to the light source of the printer or of the copying camera is automatically controlled so as to adjust the light intensity by means of the photographic density or to adjust the time of lighting, or otherwise to control the opening of the shutter, aperture of the diaphragm, or selection of the density of the filter all of which constitute the light value control mechanism of the photographic printer or copying camera.

The invention is further described in detail by means of the accompanying drawings, of which the following is a description.

FIG. 1 is an automatic printer to control the quality of a finished photographic image which is ascribable to the variation of the developing action in the combination of apparatus of the automatic printer and automatic processor, showing the apparatus whereby an image density, being formed on the photographic sensitive material, which has been exposed in the automatic printer and processed for developing, is detected by the photographic density detector positioned after the end point of the developing process of the automatic processor. With the density thereof, as a signal, the lighting period of the lamp for the printer in the automatic printer is automatically controlled and the electric power to be supplied to the lamp for printing is automatically controlled. Further the light intensity of the light source of the lighting period of the lamp is controlled. In the automatic printer consisting of a lamp 1, condenser lens 2, and magnifying lens 3, wherein negative 4 is inserted and the image is enlarged on the photographic sensitive material then printed, the luminosity of the light image projected on the sensitive material is detected by means of a light acceptor 6, such as a photo-tube, cadmium sulfide (CdS) semi-conductor, selenium photo-cell, and the output thereof is utilized to control the variable diaphragm 7 or the electric shutter 8 so as to adjust the light value for printing. The above is the method so far put into practice in the prior art In proportion to the light intensity of the image, say, the density of a negative, the light intensity is adjusted by diaphragm 7, while the time is adjusted by shutter 8. Such a conventional control method ignores the variation of density of developing image due to developing action. In other words, the exposed photographic sensitive material 5, in FIG. 1, is led through developing tank 9, fixing tank 10, and washing tank 11 to a drying section 12. There occurs a change of developing action in the developing tank 9 due to the aforestated factors. In the present invention, the image density at the point where the image is visualized (for example 13) is detected by a detector (e.g. CdS) 14, and its detected value is amplified by the amplifier 15, then led to the silicon-type control device 16 installed between the light source 17 and the light source 1 of the enlarging instrument. The functioning state automatically adjusts the lamp voltage (power) or the lighting hours in accordance with the density of image 13. As described above, the conventional system of exposure for printing is limited to control by means of the light intensity of the image from the negative. The present invention is designed to control the lamp light for printing purposes in proportion to the variation of the density of the image being formed on the sensitive material due to developing, independently or in combination with the conventional method. Furthermore, a control can be exact if the detected photographic image, as indicated in FIG. 7, is exposed using a standard quantity exposure device 18 on an end position 1 of the sensitive material in order to obtain the result of the developing process.

To express it otherwise, the present invention is a method for automatic control which consists in detecting quality of the final product of an on-line operation, then in taking action by feeding the signal back to the initial stage. The action is, therefore, a delayed action, for example, what runs on the course between the light image 5 in FIG. 1 and the detected image 13 is to follow the action taken previously. But the factors of the said developing variation (for example, fatigue of the developer due to the use, change of the liquid temperature, etc.) does not make a time-to-time change, in an ordinary case. The change is generally slow. Therefore, such delay, as is effected in this invention, involves no substantial problem. For example, providing that 400 sheets an hour, or 3,000 sheets a day, be processed, no automatic detection of developing action has been made so far. Delay of action by this invention is only by about 10 sheets. It is possible to give continuously or intermittently an exposure by a standard quantity device 18 to the position other than the image on the sensitive materials, and the amount of exposure and the exposed dimension can be selected for the benefit of the control of a light value. In addition, as already explained in FIG. 1 above, a density of photographic image after developing is detected by a combination of 13–14. It is possible to conduct this operation in a related position of 13′–14′, 13″–14″, 13‴–14‴.

FIG. 2 shows an apparatus designed to effect the method, whereby, one may control the quality of the finished image attributable to the variation in the developing action in the system, combined with automatic copying camera and automatic processor, to be used for preparation of microphotography. In doing this the density of an image, photographed and exposed using the automatic copying camera, and formed on the developed sensitive material, is detected by the photographic density detector positioned after the end point of the developing process of the automatic processor. With this detected value, as a signal, the lighting period of the lamp for photographing, of the automatic copying camera, or the electric power to be supplied to the photograph lamp is atuomatically controlled, to regulate the light intensity of the lamp. The copy 4, which is illuminated by a light source 1–2, is photographed on the sensitive film 5 through lens 3. Depending on the reflection (or transmission) of the copy, a photo-acceptor 6 is employed to automatically control the diaphragm 7 or shutter 8. This is a conventional method, and is based on the presumption that the developing action is always constant in the developing process, after photographing. However, the developing action changes, as stated above, and it is natural that a photographic image having ideal image quality cannot be expected from an adjustment of only a degree of density of the copy at the time of photographing. Such change, can be controlled by a method by which, for example, a degree of density of photographic image 13, which passes the developing tank 9 and fixing tank 10 in FIG. 2, is detected by a semi-conductor 14, such as CdS, for the correction of the exposure value at the time of exposure in camera. After being amplified with the use of an amplifier, the electric current is led to a silicon type control device 16, and the voltage (power) output to light source 1–2 from the power source 17 is adjusted, or the lighting period of the lamp 1–2 is regulated. In other words, it is possible to set it so that the intensity of light 1–2 increases in case the density of the image 13 having finished developing is lighter than desired. For a photographic image 13, it may be the one in terms of a copied image, but it is possible to control accurately by arranging a copy so as to be obtained by exposing the image by means of the standard quantity exposure device 18 on to the end portion of the sensitive material where there is no copied image as indicated in FIG. 7, and by a developing process.

FIG. 3 shows the apparatus for effecting the control method by which, in a combination automatic printer and automatic processor, to control a finished image quality due to the change of developing action, a density of the image being formed on the photographic sensitive material which is exposed to light, developed and processed with the use of automatic printer, is detected by means of a photographic density detector installed after the end point of developing process of the automatic processor. With the detected density employed as a signal an adjusting system for the light exposure value equipped in the light passage of the automatic printer is automatically adjusted to regulate the value of light exposure on the sensitive material. The conventional system consists of a mechanism comprising light source 1, condenser lens 2, and magnifying lens 3, between which a negative 4 is inserted, and a shutter 6, such as rotary solenoid type, is set in the system for making an enlarged printing on the sensitive material. The time of opening shutter 6 is controlled by detecting the intensity of light of the image projected on the sensitive material by the light acceptor 6 such as phototube, CdS, selenium photo-cell, etc., and further by leading the output thereof to solenoid 8. According to the present invention, the density of a photographic image is detected by detector 14 on the spot 13 where the images are formed as a result of developing in the course of transport of the exposed photographic sensitive materials 5 traveling to the dryer 12 through developing tank 9, fixing tank 10, and washing tank 11. This detection volume (output current) is conducted by a lead wire 15 to solenoid 8 to adjust the time of aperture of shutter 6. In other words, a variation of the density of the photographic image being formed on the shutter controls the amount of exposure of the automatic printer. Therefore, the time of aperture of shutter 6 for printing, which functions immediately following a transmission of signal from the image, is controlled according to the function of the developing process. This accomplishes the object of this invention. Control is more effective with a combination of this and a control in terms of signal emitted in proportion to the luminosity of the light image on the sensitive material 5 of the conventional process. The photographic image, to be detected for density of the image, may be detected on the spot where the negative image is exposed for printing or on the marginal position of the sensitive material by exposing by use of a standard quantity exposure device as stated earlier. In the present invention, according to FIG. 3, for the light exposure value control system, consisting of solenoid 8 or shutter 6, there may be used any such mechanism as will cause a change of light intensity by means of filter or diaphragm, instead of one designed for varying the time by a signal from the detector 7 and the detector 13. As stated earlier, in FIG. 3, the relation of the spot for detecting the image density 13 and the detector 15 is applicable to the respective position of 13′–14′, 13″–14″, or 13‴–14‴.

FIG. 4 shows an apparatus, by which, in a combined apparatus of automatic copying camera and automatic processor, the density of the photographic image being formed on the photographic sensitive material is detected by a detector for photographic density positioned after the end point of the developing process of the automatic processor. With a detected value as a signal, a system for adjusting the light value of the automatic copying camera is automatically adjusted. Thus a light value for exposure for photographing the copy on the photographic sensitive material is controlled. This is to replace the automatic printer shown in FIG. 3 with the automatic copying camera, and is designed to control the timer of aperture of shutter 6 by detecting, by means of the detector 14, the density of a photographic image appearing on spot 13 as the result of developing, by conveying the detected value (output current) through a lead wire 15 to the solenoid 8. A photo-cell acceptor to adjust by detecting the rate of reflection (or rate of transmission) of the copy 4 and conducting it to the solenoid 8, and a light source for photographing are not illustrated in terms of drawing.

FIG. 5 shows an apparatus for executing the invention, in a combination apparatus of an automatic printer equipped with a sub-exposing accessory to give multi-tone and an automatic processor, whereby the quality of an image appearing on the photographic sensitive material is detected by a photographic density detector installed after the end point of the developing process of the automatic processor (detection of one point capacitates a detection of the image quality, while detection of more than two points further capacitates more accurate detection of the image quality). With this detected value as a signal, a sub-exposing value is controlled by automatically regulating the voltage output (power) to the sub-exposing lamp of the automatic copying camera and the time for sub-exposing. The luminosity of the light image, enlarged and projected on the photographic sensitive material 5 by inserting the negative in the composition comprising a lamp 1, condenser lens 2, magnifying lens 3, is detected by a light-cell acceptor 6. By the output therefrom a diaphragm or a shutter 8 is controlled to regulate the light value for printing purposes. In addition, the sensitive material exposed at the automatic printer installed with sub-exposing lamp 7 designed for making a uniform illumination of sensitive material 5 is led to the drying part 12 through developing tank 9, fixing tank 10, and washing tank 11 of the automatic processor. The quality of the image appearing on the sensitive material due to the developing action is detected by detector 14 at point 13, and the detected value is amplified by the amplifier 15, to be conveyed to the silicon-type control device 16 installed between the lamp 17 and the sub-exposure lamp 7. The functioning consists in controlling the voltage output (electric power) to the sub-exposure lamp 7 in accordance with the variation of the image quality of photographic image 13 or the lighting time of the sub-exposure lamp 7, to provide the sensitive material with sufficient sub-exposing light for obtaining satisfactory image quality.

FIG. 6 illustrates the mechanism to control the system for regulating the processing condition by executing the present invention in the automatic processor. A system for regulating the processing condition comprises a system of regulating the developing temperature, such as electric heater, steam heater, etc., designed to regulate the performance of a developer by raising or lowering the temperature of the developer and a system for regulating the time for processing, such as a motor and variable gear, designed to regulate the time for developing by controlling the rate of transport of the sensitive material within the developing tank. According to FIG. 6, the photographic sensitive material 1, such as the exposed film, sensitive papers exposed for printing, film or sensitive paper, whereon whole or part of a standard exposure is effected, in the process step of drying and finishing through developing tank 2, fixing tank 3, and washing tank 4, for example, using a portion 1 of a continuous roll of sensitive paper as indicated in FIG. 7, the portion not available for regular printing, as a detecting portion (corresponding to 5 in FIG. 6), a density of a portion of detection 5′ processed of the standard quantity exposure is detected as an electric signal by the light acceptor (anyone generating photoelectric current such as Se photo-cell or photo-conductive such as CdS may be available at b and conveyed to the amplifier 7, amplified, and the output thereof is transmitted to the silicon type power regulator 8. Therefore, the output from the silicon type power regulator 8 increases or decreases according to the density of the said detecting portion 5', after processing of the exposed sensitive materials. The output of the silicon type power regulator 8 is transmited to a regulating system for the developing process conditions. That is, an increase or decrease in the rate of rotation is transmitted to rolls 10 for transporting sensitive materials, to control the motor 9 for transporting sensitive materials to regulate the developing time, or transmitted to the heater 11 in the processing tank for adjusting the temperature of the developer by increasing or decreasing the volume of heat generation. Also, it is possible to control simultaneously both systems for regulating the time and the temperature in the process of developing. The photographic sensitive material, used in this invention, as stated earlier, may be one exposed in a standard quantity on the position other than the area reserved for printing purposes or other whereon a photographic image is printed by an automatic printer which can be exposed to light by properly controlling the light value. In the former case, the density of the portion subjected to the standard exposure of the processed sensitive material is detected as an electric signal, while, in the latter case, an average density of the image of the processed sensitive material is detected as an electric signal.

The density detector of the processed sensitive material installed in each apparatus of FIGS. 1 through 6 (those of FIGS. 1 through 5 are indicated by 14, and FIG. 6 by 6) is composed of illumination equipment for the photographic image, a phototube, semi-conductor elements, photo-cell, etc. In addition, in some cases there is included apparatus for amplifying a current thereof, i.e., a simplified photographic density meter. A system for regulating light volume to be controlled by the density of a photographic image appearing from processing can be put to practical use without regard to the optical system from the lamp to the sensitive material. Even a contact printer or other photographic equipment can make use of this invention.

EXAMPLE 1

The invention was effected in a system for processing by printing and developing continuously using a roll of photographic paper. In more detail, in the apparatus shown in FIG. 1, using a sensitive paper for enlarging, except automatic diaphragm 7 of the automatic printer, a negative for a portrait picture and a landscape is inserted, printed, and processed. The developed image portion 13 to be detected was set so that the photographic density is 1.6 by a combination of standard exposure device 18 and developing process. The result of the cases where a control device for the amount of exposure of this invention is used and is not used is illustrated based on FIGS. 8 and 9. FIG. 8 shows the relation of the amount of exposure log E and photographic density D. Curve A is characteristic of the sensitive paper processed with fresh developer, while curve B is characteristic of paper with a used developer, and curve C is characteristic of paper processed by an older used solution, respectively. When it is set from the standard exposure amount E so that the density at point 1 is obtained in the initial stage, the density comes on point 2 in the case of curve B, and on point 3 in the case of curve C. Therefore, a signal showing a drop of density from a set point 1 to point 2 is indicated by the silicon type control device 16 through a detector 14, amplifier 15, and the volume to raise the light intensity of the lamp 1 is indicated by the exposure difference $\Delta E_1$ in FIG. 8. Likewise, a drop of density set on point 1 to point 3 is indicated by the exposure difference $\Delta E_2$. At this, it is possible to correct the exposure value by increasing the exposure amount as much as $\Delta E_1$ or $\Delta E_2$. Such relation is determined in advance by representing in a form of a figure like FIG. 9. In other words, a decreased density value is expressed in the X axis, and a corrected exposure value in the Y axis. In this manner, it was possible to correct fully a decrease in density due to fatigue of the developer, in the use of a positive printing apparatus using a photographed negative by providing the automatic control system of the apparatus with the above functions.

EXAMPLE 2

The characteristic curve shown in FIG. 11 shows the experimental data tried to prepare a microphotographic negative on a microphotographic film by use of the apparatus shown in FIG. 2. In other words, in FIG. 11, the relation of exposure value log E and the photographic density due to a fresh solution is represented by curve A, while curves B and C are characteristic of the negative images caused to be formed by the fatigued developer in the order as described. The photographic density was shown for points 1, 2, and 3 on curves A, B, and C, respectively, by giving the exposure value $E_n$ (abscissa of FIG. 11) by means of a standard quantity exposure device 18 of FIG. 2. This detected density is corrected to the right exposure value as seen in FIG. 9 in accordance with Example 1, and arranged to make a control of voltage output (electric power) of the photographic lamps 1 and 2 of FIG. 2. It is possible to have an automatic control, with the operation as illustrated above, by feeding back to the luminosity of the photographic lamps 1 and 2, since the degree of a faded capacity of the developer, due to use, is detected. Furthermore, it is possible not only to make an image of constant quality in the finished photograph, as compared with the one not using the device of the invention, but also to extend the life of developer.

EXAMPLE 3

With a use of the apparatus shown in FIG. 3, in a manner similar to that of Example 1, the density of a developed image is detected. A satisfactory result was obtained by adjusting the time of aperture of the shutter of the exposure control system in the light passage, by the use of the above signal and the signal from the detector 7 which detects the luminosity of the light image. Furthermore, a good result was obtained by adjusting the diaphragm and filter.

EXAMPLE 4

Using the apparatus shown in FIG. 4, in a similar manner as that of Example 2, the density of the developed image was detected, and, based on the signal thereof, a time of aperture of the shutter in the system for exposure control in the light passage was adjusted, with satisfactory results. It is possible to control, for example, so that an average photographic density of the image appearing on the negative can be maintained within $1.2 \pm 0.05$, after developing.

EXAMPLE 5

With a use of Fuji photographic densitometer, Type P, using filters for red light, green light, and blue light, as a detector 14 for image density of each apparatus shown in FIG. 1 and FIG. 3, and with an automatic printer revamped in a manner to enable using filters by applying the principle of additive color photography, using a color print paper, for the invention, three exposures, of red, green, and blue, were rendered on a piece of photographic material, with excellent results.

EXAMPLE 6

The experiment explained in terms of FIG. 8 in Example 1 was the case where a total photographic density decreased (parallel shift of the curve in the drawing), through the photographic tone, due to the fatigue of the developer, changed a little. FIG. 10 shows an experiment on the combination of developer and sensitive paper whose position of lower density of the printing paper does not change greatly, but the position of higher density is changed greatly, i.e., photographic tone is changed. In other words, the relation of the exposure volume log E due to the fresh developer and the photographic density D makes curve A, making curve B by the fatigued solution due to the use, and further making curve C by the more fatigued solution. However, in this example, it was possible to change the image quality by changing the photographic tone by giving a sub-exposure in addition to the printing of the negative image with a use of apparatus shown in FIG. 5. Even with the use of the same fresh developer, the curve A turn C by the fact of sub-exposure, becoming curve E with a further increase of sub-exposure, resulting in a lower contrast tone, with a curve of slow gradient in the order as described. In a similar procedure as explained on FIG. 8 in Example 1, when it was set so that a density on point 1 is achieved at characteristic curve A using a fresh solution at the time of standard exposure volume $E_n$, it turned to the density of point 2 on the curve B and a density of point 3 on curve C. Thereat, it was found that the curve B approximates the gradient of the curve D while the curve C approximates the gradient of the curve E. There exists no change of photographic tone among them, but only the distance in the direction of abscissa. Supposing that the signal detected by a detector of the apparatus shown in FIG. 5 is the density of point 2 in FIG. 10, there is no need to consider making the curve D on purpose by giving a sub-exposure since the gradients of the curve B and curve D are the same.

Therefore, it is proved that it is better to use the above signal for the control of the power of the lamp for sub-exposure. The effect of this example was the utilization of natural change by automatically detecting and judging the decrease of developing action due to processing, and further, it proved that a manual operation of the tone by sub-exposure is not necessary.

EXAMPLE 7

The effect of the apparatus shown in FIG. 6, applied on the processing of medical X-ray film is explained as follows. The medical X-ray photograph has different objectives for each internal medicine, surgery, and other field of medicine. In a general hospital, the rate of photographing for each division differs greatly for each day. Furthermore, there is a great difference when viewed hospital-wise or operator-wise, thus a volume of developed silver used for developing the image makes a great difference. In addition, there is no fixed size for the film to be used. Therefore, control of the photographic process of the medical X-ray film in terms of replenishing the developer is very difficult. According to the present invention, it is possible to maintain a constant photographic quality of the finished photograph, if the medical X-ray films are exposed under a definite light value, and processed at a specified place, since the condition of the developing process is controlled in accordance with the density of the position exposed to the definite light value. A graph in FIG. 12 shows a relation of the volume of processing the sensitive material N and the density of the position subjected to the definite exposure D. The curve A shows the condition of a decrease of density D generated by an increase in processing volume N, while the curve B shows a most advanced method, i.e., a condition of processing volume N and density D when it was achieved by manually controlling the volume of replenisher to be automatically replenished. The curve C shows a high degree of controlled precision as compared with those effected by the conventional method. The method for regulating the processing condition executed in order to obtain the curve C is performed by changing the input voltage to the heater 11 as a temperature control of the apparatus shown in FIG. 6. A relation of the temperature T and the photographic density D of the developer in the developing tank 2 is as indicated in FIG. 13, and the photographic image formed on the sensitive materials due to the developing process was controlled by use of this characteristic.

EXAMPLE 8

With the use of the light acceptor 6 of the apparatus shown in FIG. 6, density at the position where a standard exposure was made on the developed sensitive material was detected as an electric signal, and based upon this signal a variable gear of the motor 9 for transport of the photographic sensitive material was controlled, with the result almost identical to the curve C in FIG. 12. The relation of the speed of revolution S of the motor 9 and the density D of the photographic sensitive materials is as indicated in FIG. 14. A photographic image formed due to the developing process was controlled by use of this characteristic.

It is possible to control rapidly, accurately, and automatically the light exposure value or the photographic process conditions, or both, and the quality of the photographic image finally formed in a capacity of the quality of the photographic process image growing up in the final stage, since, as explained heretofore, a signal sufficient for controlling the system of exposure value control device, a control system of the photographic process conditions, or both the exposure control device and photographic process control, is detected from the quality (density and tone) of the photographic image which is formed on the photographic sensitive material, and the detected value is fed to the exposure control system such as shutter, diaphragm, filter, etc., to control the light from the lamp for exposure, or to the temperature control system in processing, to the time control system, or to the process condition adjustment system such as a system for controlling a feed of replenisher.

What is claimed is:
1. A method for controlling the exposure value, in an apparatus comprising an automatic exposure device and automatic processor, comprising:
    (a) detecting the density of the image formed on the photographic sensitive material, which has been exposed to light, developed, and processed, after the end point of the developing process of the automatic processor,
    (b) converting the detected density to an electric signal and, based on this electric signal, controlling the extent of the exposure value of subsequent sensitive material by automatically adjusting an exposure control device.
2. The method as described in claim 1, comprising controlling the light density by a control device for the electric power supplied to the lamp of the automatic exposure device.
3. The method as described in claim 1, for controlling exposure comprising using said signal to control time of exposure by operating a variable shutter in the light passage of the exposure device.
4. The method as described in claim 1, comprising controlling light density coming from the exposure lamp, by controlling a variable diaphragm in the light passage of the exposure device.
5. The method as described in claim 1, comprising controlling the density of light coming from the exposure lamp, by using a filter for varying the light transmission in the light passage of the exposure device in response to said electric signal.
6. The method as described in claim 1, comprising a photographic printer as an exposure device.
7. The method as described in claim 1, which comprises using a camera as an exposure device.
8. A method for controlling a photographic developing process comprising (a) detecting the density of an image formed on a light-sensitive surface by the development process, and (b) converting the detected density to an electrical signal to automatically adjust the system and control the development conditions of subsequent light-sensitive surfaces based on said electrical signal.
9. The method of claim 8 wherein one of said develop- ment conditions controlled by the electrical system is the temperature of the system.

10. The method as described in claim 9, comprising controlling the output of an electric heater in response to said electric signal to control said development processing.

11. The method as described in claim 9, comprising controlling the output of a steam heater in response to said electric signal to control said development processing.

12. The method as described in claim 8, comprising controlling the development processing by controlling the speed of said photographic sensitive material through said processing in response to said electric signal.

13. The method as described in claim 12, comprising controlling said speed by controlling a variable speed motor which advances said material through said processing.

14. The method of claim 12, comprising controlling a variable speed gear which advances said material through said processing.

References Cited
UNITED STATES PATENTS

| | | | |
|---|---|---|---|
| 1,895,760 | 1/1933 | Hunt | 95—89 |
| 1,908,610 | 5/1933 | Jones et al. | 95—75 |
| 2,580,779 | 1/1952 | Heyer et al. | 95—90.5 XR |
| 3,010,362 | 11/1961 | Smith | 88—24 |

NORTON ANSHER, Primary Examiner

RICHARD L. MOSES, Assistant Examiner

U.S. Cl. X.R.

95—90.5; 355—27, 67